United States Patent
Thomson et al.

(10) Patent No.: US 8,542,554 B2
(45) Date of Patent: Sep. 24, 2013

(54) METHOD FOR VELOCITY MODEL BUILDING AND ANALYSIS

(75) Inventors: Colin J. Thomson, Cambridge (GB); Philip Kitchenside, Orpington (GB)

(73) Assignee: WesternGeco L.L.C., Houston, TX (US)

( * ) Notice: Subject to any disclaimer, the term of this patent is extended or adjusted under 35 U.S.C. 154(b) by 473 days.

(21) Appl. No.: 12/709,868

(22) Filed: Feb. 22, 2010

(65) Prior Publication Data

US 2011/0110190 A1 May 12, 2011

Related U.S. Application Data

(60) Provisional application No. 61/259,947, filed on Nov. 10, 2009.

(51) Int. Cl.
*G01V 1/00* (2006.01)

(52) U.S. Cl.
USPC .......................................................... 367/38

(58) Field of Classification Search
USPC .......................................................... 367/38
See application file for complete search history.

(56) References Cited

U.S. PATENT DOCUMENTS

| | | | |
|---|---|---|---|
| 5,103,429 A | 4/1992 | Gelchinsky | |
| 5,260,911 A * | 11/1993 | Mason et al. | 367/57 |
| 5,285,422 A * | 2/1994 | Gonzalez et al. | 367/53 |
| 5,508,973 A * | 4/1996 | Mallick et al. | 367/38 |
| 6,839,658 B2 | 1/2005 | Causse et al. | |
| 6,862,531 B2 * | 3/2005 | Horne et al. | 702/14 |
| 7,039,525 B2 | 5/2006 | Mittet | |
| 2003/0167126 A1 * | 9/2003 | Horne et al. | 702/14 |
| 2009/0257308 A1 | 10/2009 | Bevc et al. | |
| 2010/0110830 A1 * | 5/2010 | Thomson | 367/21 |
| 2010/0118652 A1 * | 5/2010 | Schneider | 367/52 |

OTHER PUBLICATIONS

N. Ross Hill, 'Prestack Gaussian-beam depth migration', Geophysics, vol. 66 No. 4 p. 1240-1250, Jul.-Aug. 2001.*
Biondi, et al, Angle-Domain Common-Image Gathers for Migration Velocity Analysis by Wavefield-Continuation Imaging, Geophysics, Sep.-Oct. 2004, pp. 1283-1298, vol. 69, No. 5.
Sava, et al., Angle-Domain Common-Image Gathers by Wavefield Continuation Methods, Geophysics, May-Jun. 2003, pp. 1065-1074, vol. 68, No. 3.
Rickett, et al., Offset and Angle-Domain Common-Angle Point Gathers for Shot-Profile Migration, Geophysics, May-Jun. 2002, pp. 883-889, vol. 67, No. 3.
Sava, et al., Wave-Equation Migration Velocity Analysis I, Theory, Geophysical Prospecting, 2004, pp. 593-606, vol. 52.
Sava, Efficient Computation of Extended Images by Wavefield-Based Migration, SEG 79th Annual International Meeting, 2009.
Vasconcelos, et al., Wave-Equation Extended Images via Image-Domain Interferometry, SEG 79th Annual International Meeting, 2009.
International Search Report of PCT Application No. PCT/US2010/056066 dated Jun. 30, 2011: pp. 1-4.

* cited by examiner

*Primary Examiner* — Isam Alsomiri
*Assistant Examiner* — James Hulka

(57) ABSTRACT

Method for velocity model building and analysis using wavefield-coordinates reflection operators in wave-equation migration or reverse-time migration.

22 Claims, 11 Drawing Sheets

METHOD FOR VELOCITY MODEL BUILDING AND ANALYSIS

CROSS-REFERENCE TO RELATED APPLICATIONS

The present application claims priority under 35 U.S.C. §119(e) to U.S. Provisional Application Ser. No. 61/259,947 filed on Nov. 10, 2009, with the same title and by the same inventors.

BACKGROUND OF THE INVENTION

1. Field of the Invention

This invention relates data processing for geophysical exploration, more specifically related to building velocity models for interpreting and refining a subsurface model in geological exploration.

2. Description of the Related Art

One of the methods used by the industry for obtaining images of the subsurface geology is wave-equation migration. Wave-equation migration uses a "one-way" or "two-way" wave equation to propagate the recorded data (sometimes referred to as the "receiver" wavefield) back into the subsurface. Simultaneously, the propagation of the wave field due to the seismic source is modeled throughout the subsurface. This wavefield is commonly referred to as the source wavefield. Migration with the "one-way" equation is commonly referred to as wavefield-extrapolation migration (WEM), whereas migration with the "two-way" equation is referred to as reverse-time migration (RTM). At a number of finely regularly sampled locations throughout the subsurface, the propagated source and receiver wavefields are combined in a way that provides an image of the subsurface geology.

Reflection operators are related to common-image gathers (CIGs) that are the subject of an extensive literature. There are different types of CIG. For example, one type of CIG could be constructed from the energy at zero-time on the reflection operators, if the operators are computed for a sampled range of depths. Such a CIG would then be a panel of migrated energy displayed as a function of the depth z and x, where x is the lateral separation of the down-going and up-going wavefield components. The latter are conventionally sampled at constant midpoint.

The analysis of certain types of CIG produced during prestack depth migration is a standard means of refining a depth migration velocity model. Events on CIGs produced by prestack Kirchhoff migration are horizontal when the migration velocity is exact. The horizontal property can be used as a tool for testing the velocity field or for deriving corrections which are then used to improve the velocity field. Similar comments may be made with regard to angle-domain common image gathers produced during midpoint-offset wave-equation migration. Recently so-called "extended" image gathers have been discussed in public.

Some references regarding CIGs are:

Biondi, B. and Symes, W., W., 2004. Angle-domain common-image gathers for migration velocity analysis by wavefield-continuation imaging, Geophysics, 69, 1283-1298

Sava, P. C. and Fomel, S., 2003. Angle-domain common-image gathers by wavefield continuation methods, Geophysics, 68, 1065-1074.

Rickett, J. E. and Sava, P. C., 2002. Offset and angle-domain common-angle point gathers for shot-profile migration, Geophysics, 67, 883-889.

Sava, P. and Biondi, B., 2004. Wave-equation migration velocity analysis. I. Theory, Geophysical Prospecting, vol. 52, 2004, Sava, P. and Vasconcelos, I., 2009. Efficient computation of extended images by wavefield-based migration, 79th Ann. Internat. Mtg., Soc. Expl. Geophys., Expanded Abstracts.

Vasconcelos, I, Save, P. and Douma, H., 2009. Wave-equation extended images via image-domain interferometry, 79$^{th}$ Ann. Internat. Mtg., Soc. Expl. Geophys., Expanded Abstracts.

It is desirable to have a better method and apparatus to refine the velocity models for geological exploration

BRIEF SUMMARY OF THE INVENTION

This invention pertains to seismic imaging where images of the subsurface geology are constructed using wave-equation migration. The invention uses the propagated source and receiver wavefields modeled by reverse-time migration or wavefield-extrapolation migration to construct "wavefield-coordinates" reflection operators at locations throughout the subsurface. The synthesized reflection operators are used to interpret and refine the subsurface model. This may be done locally by matching parametric approximations of reflection operators obtained from wave theory with the synthesized reflection operators obtained from the data. The same concepts may also be used in a more global tomographic inversion approach.

BRIEF DESCRIPTION OF THE SEVERAL VIEWS OF THE DRAWINGS

A better understanding of the invention can be obtained from the following detailed description of the preferred embodiments in conjunction with the drawings.

DETAILED DESCRIPTION OF THE INVENTION

One of the methods used by the industry for obtaining images of the subsurface geology is wave-equation migration (also referred to as wavefield-continuation migration or WEM migration). Wave-equation migration uses a "one-way" or "two-way" wave equation to propagate the recorded data (sometimes referred to as the "receiver" wavefield) back into the subsurface. Simultaneously, the propagation of the wave field due to the seismic source is modeled throughout the subsurface. This wavefield is commonly referred to as the source wavefield. Migration with the "one-way" equation is commonly referred to as wavefield-extrapolation migration (WEM), whereas migration with the "two-way" equation is referred to as reverse-time migration (RTM). At a number of finely regularly sampled locations throughout the subsurface, the propagated source and receiver wavefields may be combined in a way that provides an image of the subsurface geology. The propagation of the wavefields requires an accurate estimate of the velocity model of the subsurface to be specified. The methods disclosed here use the propagated source and receiver wavefields to construct so-called "wavefield-coordinates" reflection operators at locations throughout the subsurface. A qualitative and quantitative analysis of the reflection operators is then used to improve the model.

A particular reflection operator pertains to an (x,y,z) location within the subsurface and comprises a number of modeled seismic traces. The z coordinate usually signifies the depth at which the reflection operator is constructed and x and y denote its lateral position. More generally, the coordinate frame could be tilted so that the surface of constant z is a plane that is not horizontal or flat-lying. Such a plane might arise in a targeted imaging method. The important point and a key assumption are that a set of source and receiver wavefields are known across a sufficiently wide aperture on some plane of constant z ("depth"). In preferred embodiments of the ideas, there will be many such planes throughout the subsurface, but it suffices to consider one example in order to understand basic principles.

Each trace of the reflection operator represents the wavefield which would be recorded by a receiver at (x,y,z) due to a localized down-going source wavefield at another x',y' (at the same depth). The reflection operator therefore characterizes the response of that part of the medium deeper than z.

Figure 1:
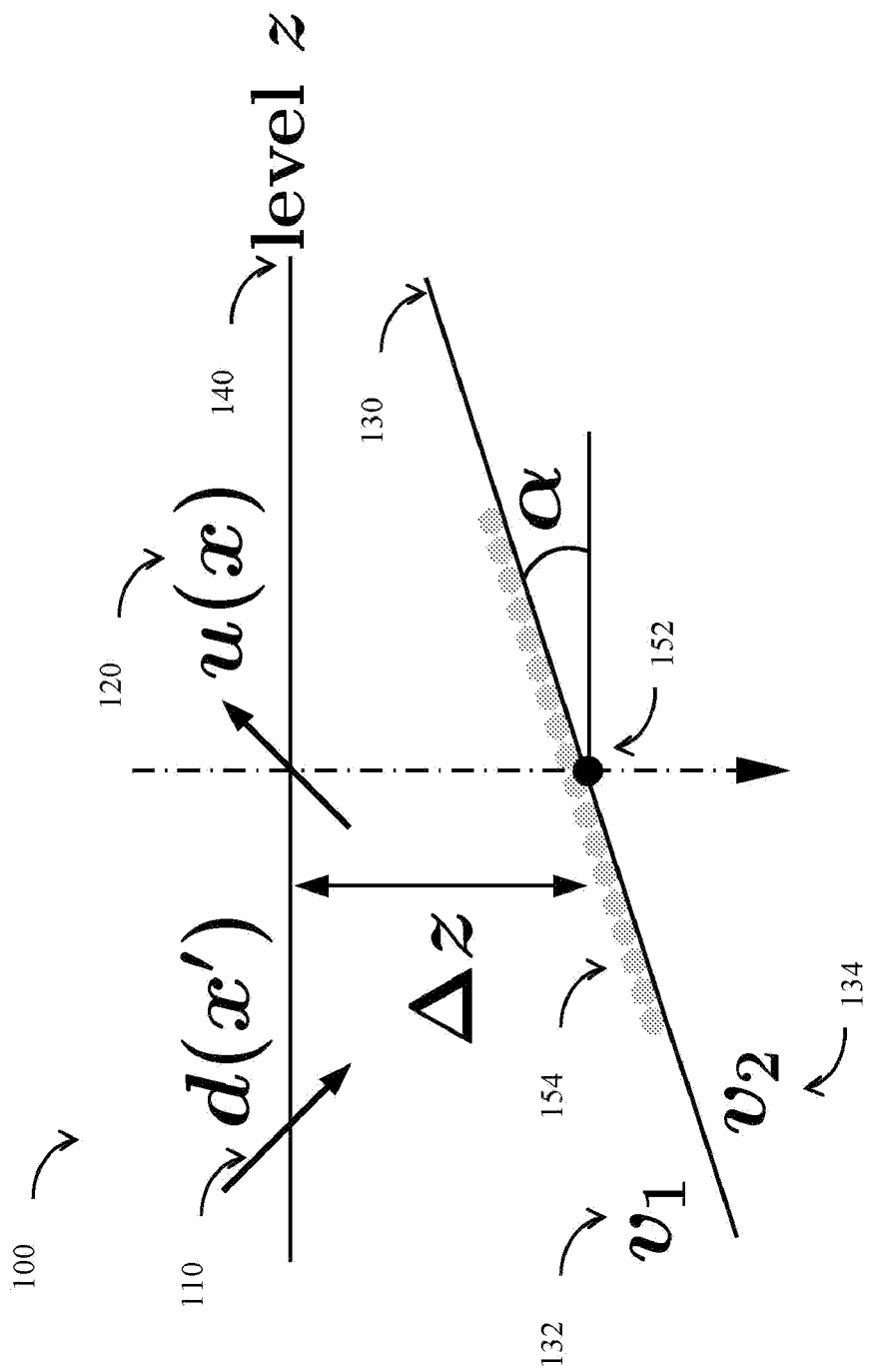
FIG. 1 depicts a basic reflection-operator geometry.

This scenario 100 is illustrated by FIG. 1. FIG. 1 shows a flat datum 140 at which the reflection operator is defined or computed. A downgoing incident wave d(x') 110 and upgoing reflected wave u(x) 120 just above a segment of a leftward-dipping plane reflector 130, with dip angle α and wave speeds $v_1$ and $v_2$ Given sufficient realizations of the incident and reflected waves from multiple sources, the reflection properties of the dipping interface can be characterized in the neighbourhood shown by the row of small hexagons 154. Migration or further depth extrapolation with trial velocities is one way of doing this and the apparent reflection operator that is imaged in that way can be used to improve a preliminary velocity model.

Also shown is a plane dipping reflector 130 which serves as the interface between two constant-velocity media 132 and 134 having velocities $v_1$ and $v_2$ respectively. The reflection operator for this structure 130 will act upon an arbitrary downgoing or incident wave 110 at the datum level 140 so as to yield the upgoing or reflected wave 120 at the same datum level 140. The reflection operator is a function of x, x' and t. If the incident wave 110 is localized at x' (i.e. a spatial delta-function wavefield), then the response at x is a time series that looks like a quasi-point-source response of the dipping plane interface. If x is fixed and a set of incident-wave points x' are sampled, we obtain the traces of the reflection operator referred to in the previous paragraph. It is possible to imagine the sample points of x and x' as defining the rows and columns of the reflection operator viewed as a matrix. This viewpoint is straightforward at one frequency, but more elaborate in the time domain. Visualizing the form of the operator in space-time is central to understanding the form of extended image gathers or CIGs.

Note that the reflection operator concept is independent of how the incident and reflected wavefields are obtained near a boundary, and so similar principles apply to WEM and RTM. One key feature is that wavefields sampled over subsurface planes are used to estimate properties, rather than ray-based point data, as with Kirchhoff migration gathers. For brevity of notation, the out-of-plane y direction will be omitted from the subsequent discussion. The location x' is used to label a trace within the reflection operator defined at a fixed x and x'-x is therefore the source—receiver subsurface wavefield offset. Typically the x' are regularly sampled. This representation of the reflection response is referred to as a "wavefield-coordinates" representation because one of either x or x' is held constant not their midpoint.

It may be shown that a subsurface extended image gather or CIG is in essence an estimate of the reflection operator at a point in some neighborhood of the reflector. The CIG may also contain signals from many distant reflectors, but for simplicity, the analysis is done for the nearest or primary reflections.

It is helpful to recognize that the wavefield-coordinates reflection operator (or extended gather) will appear kinematically similar to the wavefield that would be obtained if a source were to be placed just above depth z at lateral location x, such a wavefield being observed as a function of x' and t. Alternatively, one may envisage a source at x' and observe the operator or extended gather as a function of x and t. By using wavefield coordinates (x,x'), the effects of dip on the reflection-operator gathers is revealed in a physically interpretable way before a final fully stacked image is formed. A reflection operator is an Earth property and estimates of local reflection operators obtained by wavefield extrapolation/migration methods are potentially dynamically as well as kinematically interpretable, for example including total reflections and headwaves. They therefore provide a connection between amplitude variation with offset (AVO) analysis and imaging. A key result leading to one embodiment is the wave-theory prediction of the dynamic form of the reflection operator (or gather) for a dipping plane interface. This will be discussed later. To put this embodiment in context, it is appropriate to briefly describe some algorithmic features of wave-equation migration. The input data consist of shot records, where a shot record is a collection of seismic traces which are records of acoustic energy reflected from geological interfaces, the energy being due to a single seismic source. WEM computations are usually carried out in the frequency-space (ω-x) domain, whereas RTM operates in the space-time domain. At a discrete set of depths an image is constructed by suitably combining two wavefields. One wavefield is the extrapolated hypothetical source wavefield d which is typically an impulse function. The other is the extrapolated recorded wavefield u. Two well-known formulae for constructing a WEM image using frequency-space domain computations are:

$$I(x, z) = \sum_s \sum_\omega \bar{d}_s(x, z, \omega) u_s(x, z, \omega), \quad \text{Eq (5)}$$

and $$I(x, z) = \sum_s \sum_\omega \frac{\bar{d}_s(x, z, \omega) u_s(x, z, \omega)}{d_s(x, z, \omega)\bar{d}_s(x, z, \omega)}, \quad \text{Eq (6)}$$

where the second form Eq(6) is more dynamically correct (appropriate for AVO studies). In the above $\bar{d}_s$ denotes the complex conjugate of $d_s$ and the s subscript refers to a particular shot record. Note that the image $I(x,z)$ is actually the sum over all shots (experiments).

The method uses the same frequency-space domain wave fields to construct either $$R(x, z, x', t) = FT^{-1}\left[\sum_s \bar{d}_s(x', z, \omega) u_s(x, z, \omega)\right], \quad \text{Eq (7)}$$

or $$R(x, z, x', t) = FT^{-1}\left[\sum_s \frac{\bar{d}_s(x', z, \omega) u_s(x, z, \omega)}{\bar{d}_s(x', z, \omega) d_s(x', z, \omega)}\right], \quad \text{Eq (8)}$$

where $FT^{-1}$ denotes an inverse Fourier transform with respect to time. The form chosen is unimportant except when the amplitude versus offset behaviour of a reflection operator is used to characterize the velocity contrast at the reflector. In this case, the second form should be used. Note that when computing R, the lateral spatial locations of d and u differ.

If sufficient shots are included, the function $R(x,z,x',t)$ is an estimate of the reflection operator that relates the down-going wavefield at location $(x',z)$ to the up-going wavefield at $(x,z)$. Therefore it describes the reflection response of the Earth for locations deeper than z, if we ignore or remove possible contributions due to reflectors above. Hence $R(x',t)$ may be referred to as a reflection operator at x. It is a panel of energy which may be visualized as a function of x' and time t, for each location x of interest at the current depth z.

The RTM analogs of the above expressions for $R(x,z,x',t)$ are $$R(x, z, x', t) = \sum_s \sum_T d_s(x', z, T) u_s(x, z, T - t), \quad \text{Eq (9)}$$

and $$R(x, z, x', t) = \sum_s \frac{\sum_T d_s(x', z, T) u_s(x, z, T - t)}{\sum_T d_s(x', z, T) d_s(x', z, T)}. \quad \text{Eq (10)}$$

Note that x and x' are wavefield coordinates, as opposed to the midpoint-offset coordinates that are generally used in imaging work. Significantly different results will be obtained when the wavefields d and u are sampled at constant midpoint, and in particular the effects of reflector dip may be obscured by using such coordinates.

The model update part of the method utilizes formulae derived from a wave-theoretical investigation of $R(x,z,x',t)$. Wave theory enables the reflection operators for simple earth models to be formulated as integrals over a slowness or ray parameter p. In particular, the frequency domain form of $R(x,z,x',t)$ for a dipping reflector lying somewhat below the level z is given by $$R(x, z, x', \omega) = \frac{1}{2\pi} \int R(p, \omega)\left(\cos\alpha - \frac{p}{q}\sin\alpha\right) e^{i\omega\phi(p,q,\alpha,\Delta z,x,x')}|\omega| dp, \quad \text{Eq (1)}$$

where $$\phi(p, q, \alpha, \Delta z, x, x') = 2q\Delta z\cos\alpha - q(x + x')\sin\alpha + p(x - x')\cos\alpha \quad \text{Eq (2)}$$

and where
ω—frequency,
α—angle of dip of the reflector,
p—plane-wave ray parameter ("horizontal" slowness) parallel to the dipping interface,
$q=(v_1^{-2}-p^2)^{1/2}$ is the corresponding "vertical" (normal) slowness corresponding velocity $v_1$ above the interface,
x, z—will be referred to as the spatial location of reflection operator using a local reference frame in which the imaged wavefields are on the surface of constant z and x=0 lies within the aperture of these wavefields,
x'—will be chosen as the roving spatial coordinate within the reflection operator panel defined at x,
Δz—vertical distance down from level z to the reflector/interface at the local origin of coordinates x=x'=0,
R(p,ω)—plane-wave reflection coefficient in the natural tilted frame of the plane reflector, which depends on sgn(ω)since it relates to the complex Fourier transform of a real time function (or rather operator, namely the real space-time reflection operator).

The above formula may be used to predict how the reflection operator gathers will evolve if the data are further extrapolated from the level z downwards towards the reflector and even to levels at which the extrapolated incident and reflected wavefields for each shot are taken beyond the physical limits of the layer above the interface (i.e. analytically continued). Note that while such extrapolation is a familiar concept in WEM, with RTM there is more to consider since the velocity model may have an actual interface. For present purposes we may imagine a local WEM-like extrapolation with velocity $v_1$ or possibly with an incorrect migration velocity $v_m$. Similar ideas apply to RTM, but there then exists more readily the additional possibility of imaging the reflector "from below", provided the correct space-time window of the source and receiver wavefields is considered.

Figure 2A:
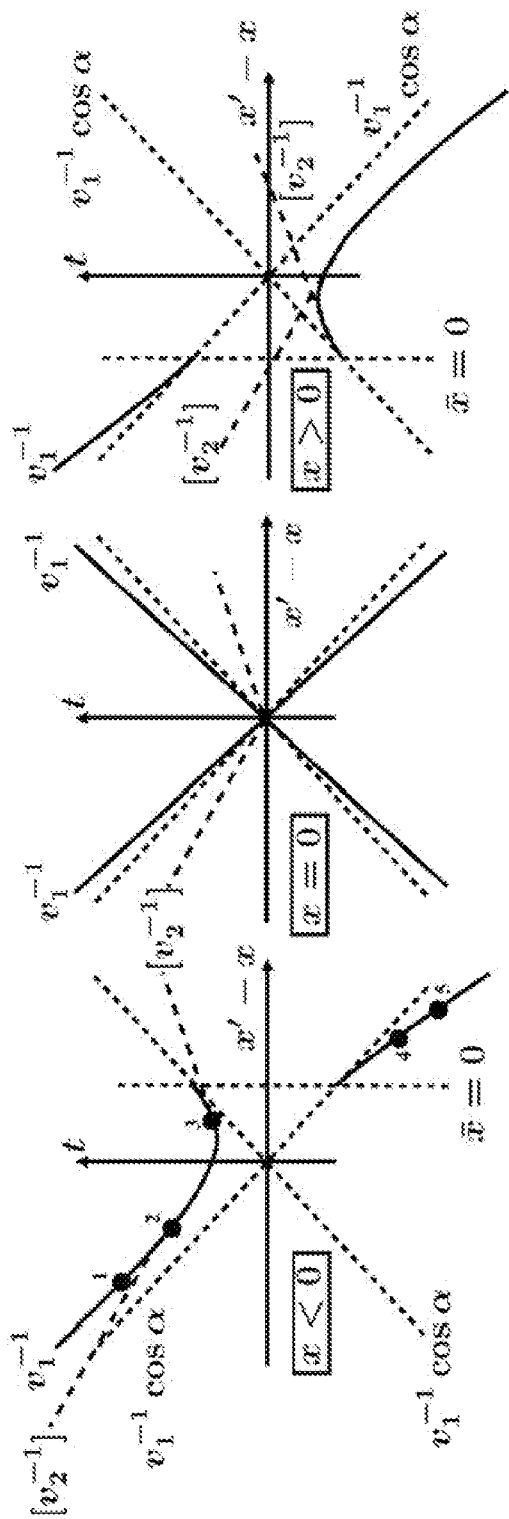
FIG. 2a depicts the asymptotic (stationary phase and branch point) behavior of a wavefield-coordinates reflection operator above, at and below a leftward-dipping plane interface, showing the kinematics of various signals in the (x',t) domain when the migration velocity equals the true velocity above the reflector. Solid curves indicate stationary-phase signals and dashed lines indicate branch-point signals.

FIG. 2a shows the predicted kinematic behaviour of a reflection operator in the vicinity of a planar leftward-dipping reflector when the migration velocity equals the true local velocity above the interface. The predictions were derived by asymptotic analysis of the full dynamical expression for the reflection operator in such a model.

In each panel of FIG. 2a, the horizontal axis represents the spatial coordinate x' and vertical axis represents the time t. The form of the reflection operator is determined by many factors. In particular, the location x of the operator relative to the reflector, the acquisition geometry, the geometry of the reflector, the velocity used for the migration (the migration velocity) and the actual medium velocity. Note that when the reflection operator is computed at a depth greater than that of the reflector, or equivalently at a point x>0 to the right of the reflector, rightmost panel, then the asymmetric hyperbolic curve is inverted. The method combines the described theoretical properties of reflection operators with numerical reflection operators computed during wave-equation migration.

There are signals in FIG. 2a that correspond to physical arrivals, such as the dipping-reflector shifted hyperbola (solid) and tilted linear head-wave signals (dashed) in the left frame, which corresponds to points (x,x') that lie above and to the left of the dipping interface. Other signals are not physical, such as the inverted hyperbola (solid) in the right frame that corresponds to data that have been extrapolated below or to the right of the reflector (over-migrated).

Figure 2B:
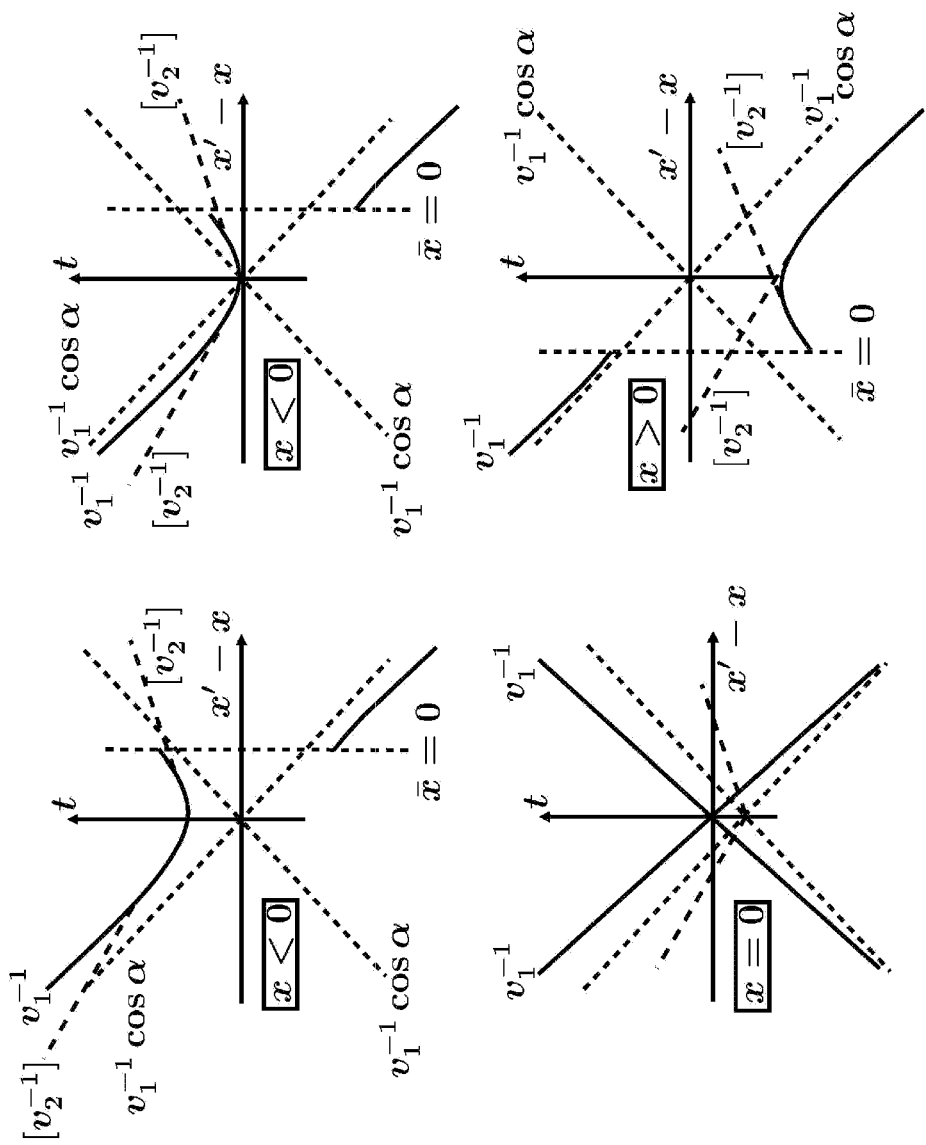
FIG. 2b depicts the asymptotic (stationary phase and branch point) behavior of a wavefield-coordinates reflection operator above, at and below a leftward-dipping plane interface, showing the kinematics of various signals in the (x',t) domain when the migration velocity is somewhat less than the true velocity above the reflector.

FIG. 2b shows the corresponding predicted kinematic behavior of a reflection operator imaged in the vicinity of the planar leftward-dipping reflector when the migration velocity is somewhat less than the true local velocity above the interface. The predictions were again derived by asymptotic analysis of the full dynamical expression for the wavefield-coordinates reflection operator in such a situation.

There are many features in FIG. 2b that have been analyzed, but perhaps the main feature to mention at this stage is seen in the top-right frame, where the dipping-interface hyperbola is tangential to the x' axis at time t=0. This occurs at depths or x locations that are shallower or above the leftward-dipping interface, because the migration velocity is too low. A primary claim in this method is that geometrical observations such as this can be interpreted in terms of the reflector properties (distance of the operator/gather location x from the interface, true medium velocity, reflector dip, etc.).

Figure 3:
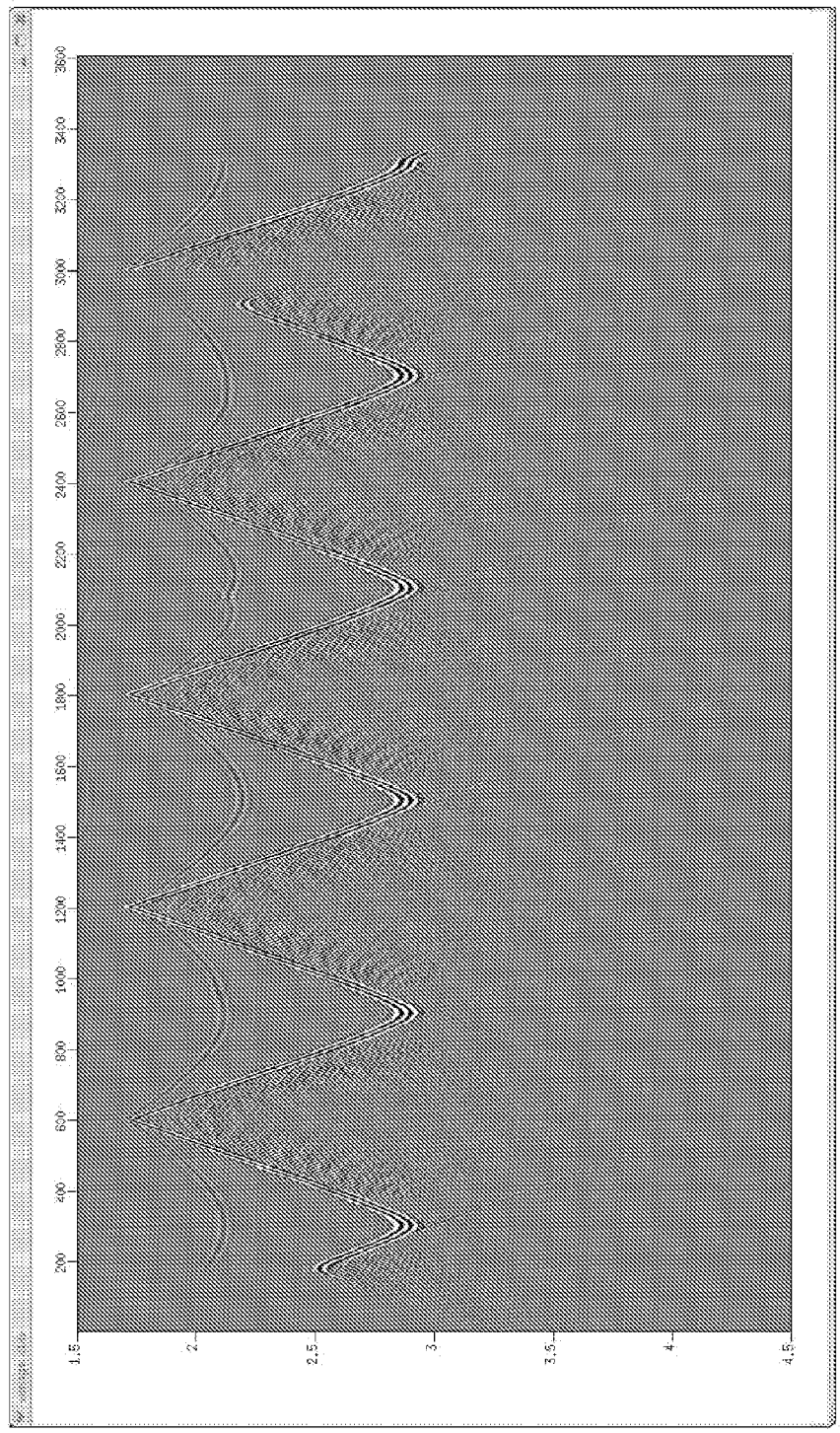
FIG. 3 depicts six reflection operators computed during wave-equation migration of synthetic data at various x-locations within the water layer.

FIG. 3 shows six reflection operators which have been constructed during the migration of a synthetic dataset. For display purposes the six reflection operator panels have been displayed side by side as a single panel of data. The operators have all been computed at the same depth, but at different lateral (x) locations within the water layer. The dominant seismic event on each panel corresponds to the water bottom reflection. The hyperbolic nature of this event is characteristic of a reflection operator located above a reflector, where the velocity model above the reflector is mildly laterally varying.

Figure 4:
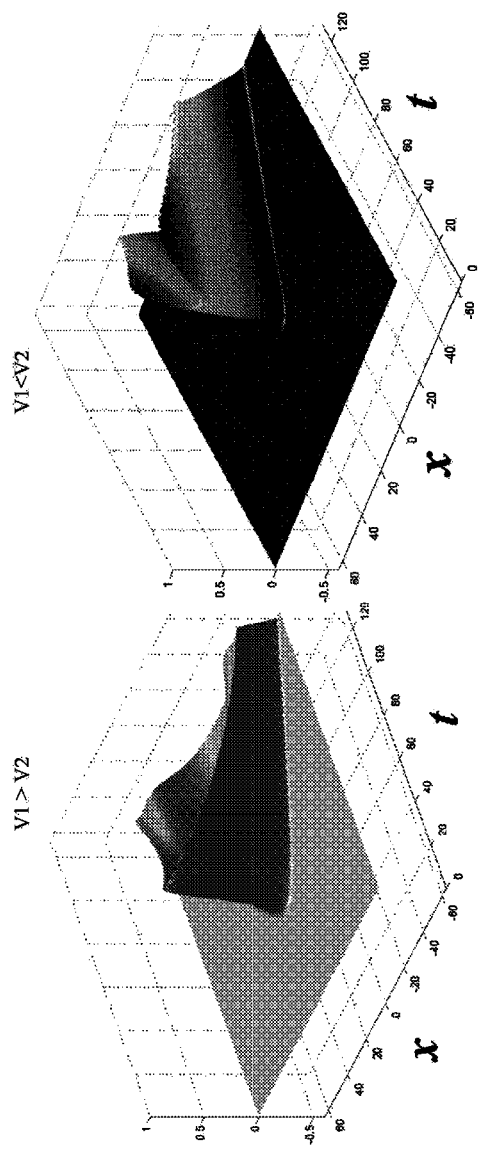
FIG. 4 depicts the amplitude behavior of a reflection operator located above a flat reflector associated with a velocity contrast. The plot on the left of the Figure shows the reflection operator amplitude as a function of x and t and is for the case where the velocity above the reflector is greater than the velocity below. The plot on the right is for when the velocity above the reflector is smaller.

The amplitudes of refection operator events also provide information about the velocity contrast at a reflector. FIG. 4 shows how, for the simple example of a flat boundary, the amplitude of a reflection operator varies with source-receiver offset as a function of the velocity contrast. Note that the amplitude of the reflection operator decreases with increasing source-receiver offset when the velocity above the reflector is the largest. If velocity increases, the converse is true for small source-receiver onsets corresponding to near normal incidence partial reflections.

Note that in fact it is the time integral of the reflection operator that is plotted in FIG. 4, as this is less singular than the actual reflection operator. Furthermore, it can be recognized that when the time derivative is applied to these plotted functions, there arises a dipole-like time dependence along the central x=0 time axis. This may have implications for the nature of "point" focus behaviour that is used by some authors as a criterion for velocity model refinement.

Figure 5:
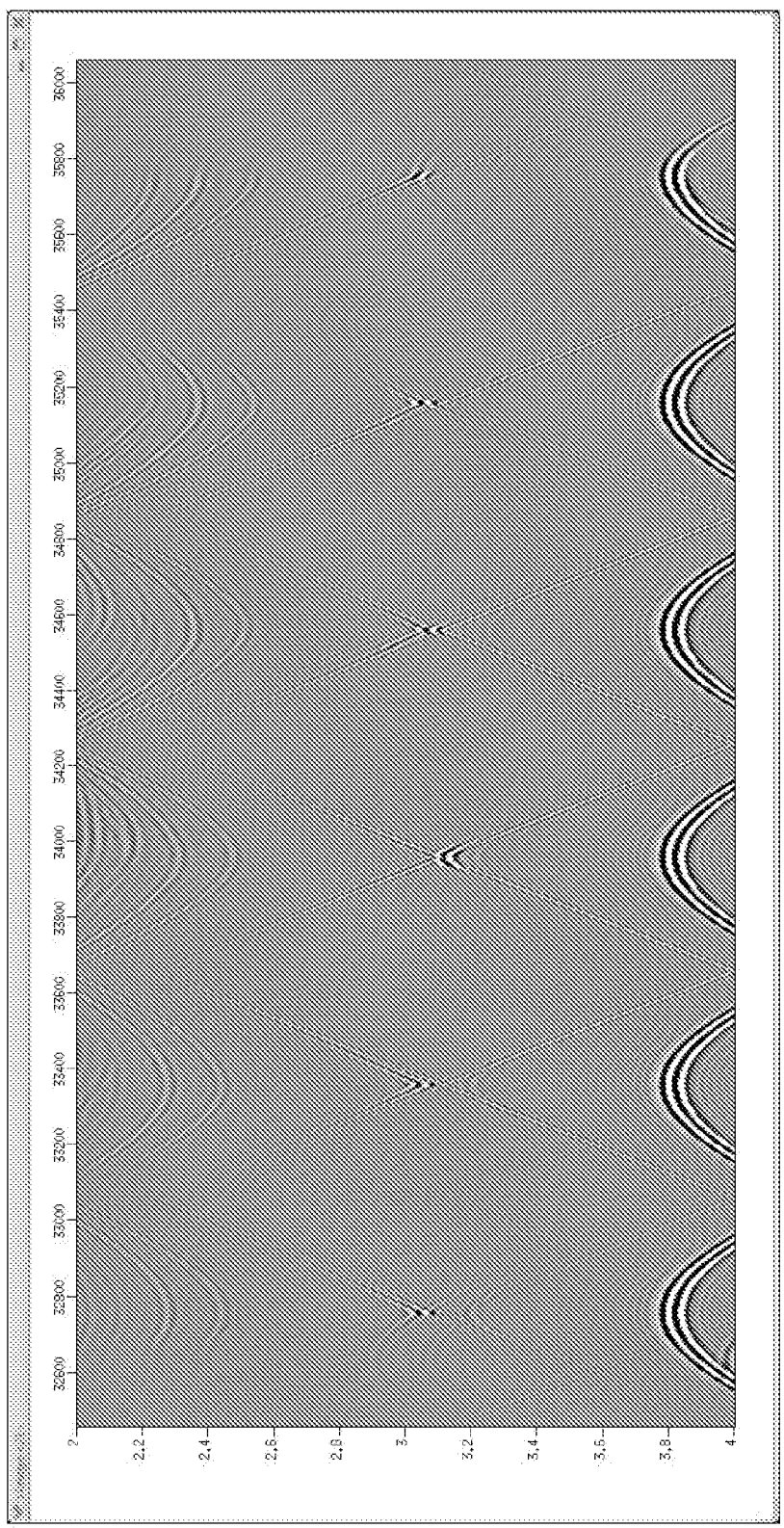
FIG. 5 depicts six reflection operators computed during wave-equation migration of the synthetic data, at a depth below the water bottom.

FIG. 5 shows six reflection operators computed during wave-equation migration of the synthetic data at a depth below the water bottom. In FIG. 5 upturned events are evident. From the theory (see FIG. 2a or 2b), these arise when the reflection operator is computed at a depth greater than the true reflector depth. Also shown in FIG. 5 are events which have been focussed to an impulse with linear arms. These occur when the depth of the reflection operator coincides with the depth of the corresponding reflector (see centre panel of FIG. 2a). The slopes of the linear arms are determined by the velocities above and below the reflector in question.

Local Travel-Time Analysis

The reflection operator leading-order kinematics (i.e. geometrical ray times) can be parameterized in terms of the structure and the velocity model. Furthermore, the effects of velocity error can be obtained by perturbation analysis. For example, assume that the data at the primary datum level z referred to above are error free and consider a further extrapolation of the wavefields towards the reflector using an erroneous migration velocity $v_m$. This erroneous local one-way extrapolation of the wavefields leads to new reflection operators or gathers at the new depth levels that will differ from what would have been obtained using the true velocity above the reflector. More generally the data at the primary datum level z will also have uncertainties, due to uncertainties in an overburden model. In that case, variations in the overburden propagator must be included, but for present purposes it suffices to assume that the primary datum values are accurate and to focus on locally induced distortions of the reflection operator.

If the erroneous migration velocity is assumed to be close to a locally homogeneous true velocity, the following analytical expression is a kinematic approximation of a reflection operator located at a new level near the planar dipping reflector and below the original primary datum level z:

$$t = T_0\left(1 - \frac{\delta v}{v_m}(1 - A)\right), \quad \text{Eq (3)}$$

$$T_0 = \frac{1}{v_m}(x'^2 \cos^2\alpha + 4((x'/2)\sin\alpha - (\Delta z - \delta z)\cos\alpha)^2)^{1/2}, \quad \text{Eq (4)}$$

$$A = \frac{4\delta z((x'/2)\sin\alpha - (\Delta z - \delta z)\cos\alpha)}{4\cos^2\alpha((x'/2)\sin\alpha - (\Delta z - \delta z)\cos\alpha)^2 - x'^2\cos^2\alpha\sin^2\alpha}. \quad \text{Eq (5)}$$

where
t—time of the reflection operator geometrical-ray type of arrival
δz—the depth at which the new reflection operator or gather is computed as measured from the original datum level z of eq. (1.)
α—angle of dip of the reflector
x—lateral spatial coordinate within the reflection operator panel
$v_m$—the specified migration velocity, in general different from the true velocity above the reflector
Δz—true vertical distance from the original datum z-location of eq. (1.) to the reflector at x'=0
δv—velocity error (difference between the medium velocity and migration velocity)

In fact, two kinds of kinematic approximation may be obtained by asymptotic (stationary phase) analysis of the analytically known reflection operator (for a dipping plane reflector between homogeneous media), and the effects of an erroneous migration velocity can be included. The approximation above does not assume small dip, whereas an alternative approximation does assume small dip.

The velocity error may be estimated by scanning over δv and observing the value giving the best agreement between the kinematic approximation and the wave-equation migration reflection operator. A threshold of velocity errors is given as a measure of the quality the corresponding velocity model. The velocity error determination may be done either quantitatively by performing a least-squares fit of x-t values picked from an event on the reflection operator or qualitatively by visual inspection.

Figure 6:
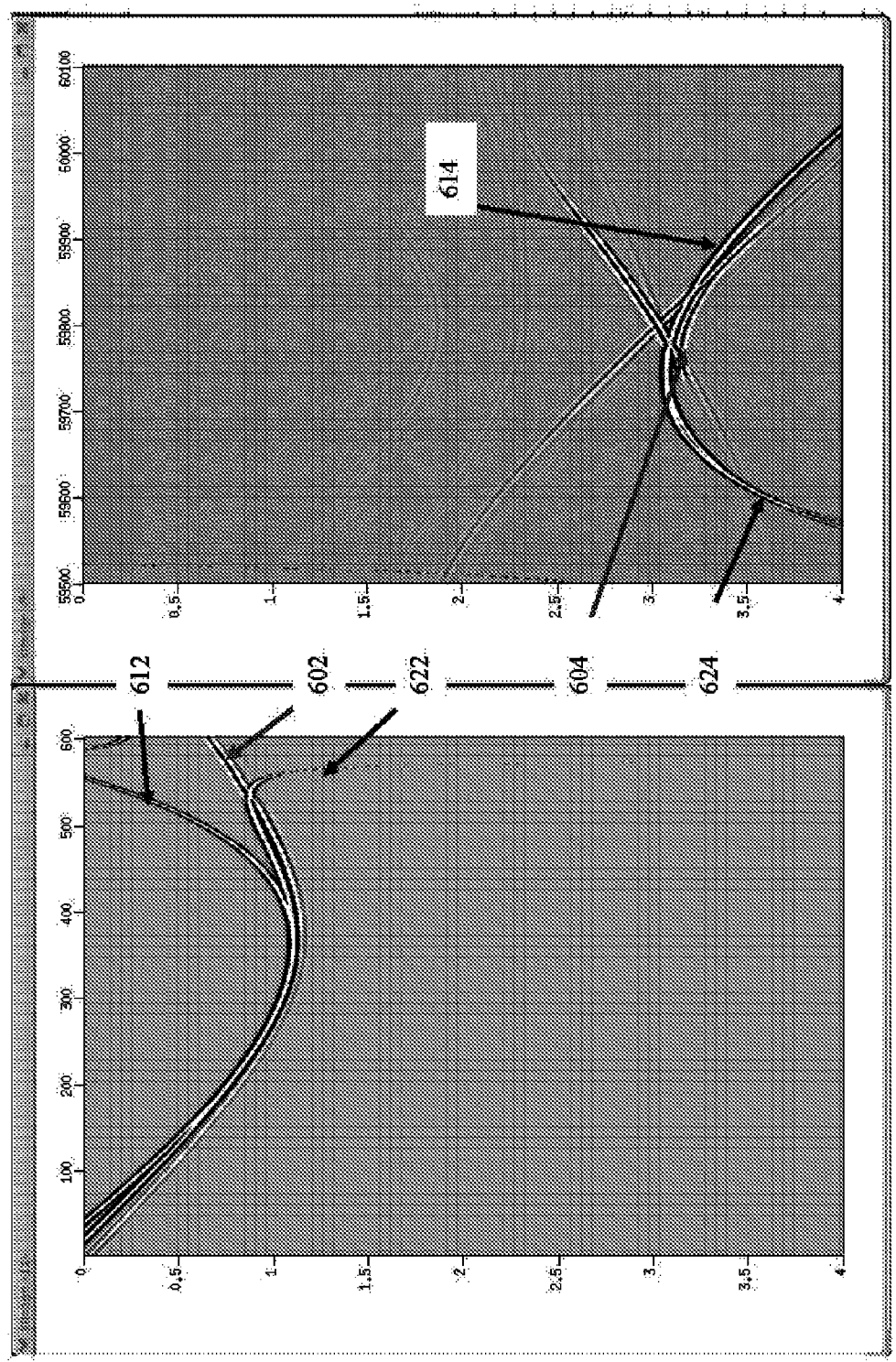
FIG. 6 depicts a fitting of two wave-equation migration reflection operators computed above (left panel) and below (right panel) a planar dipping reflector.
Figure 7:
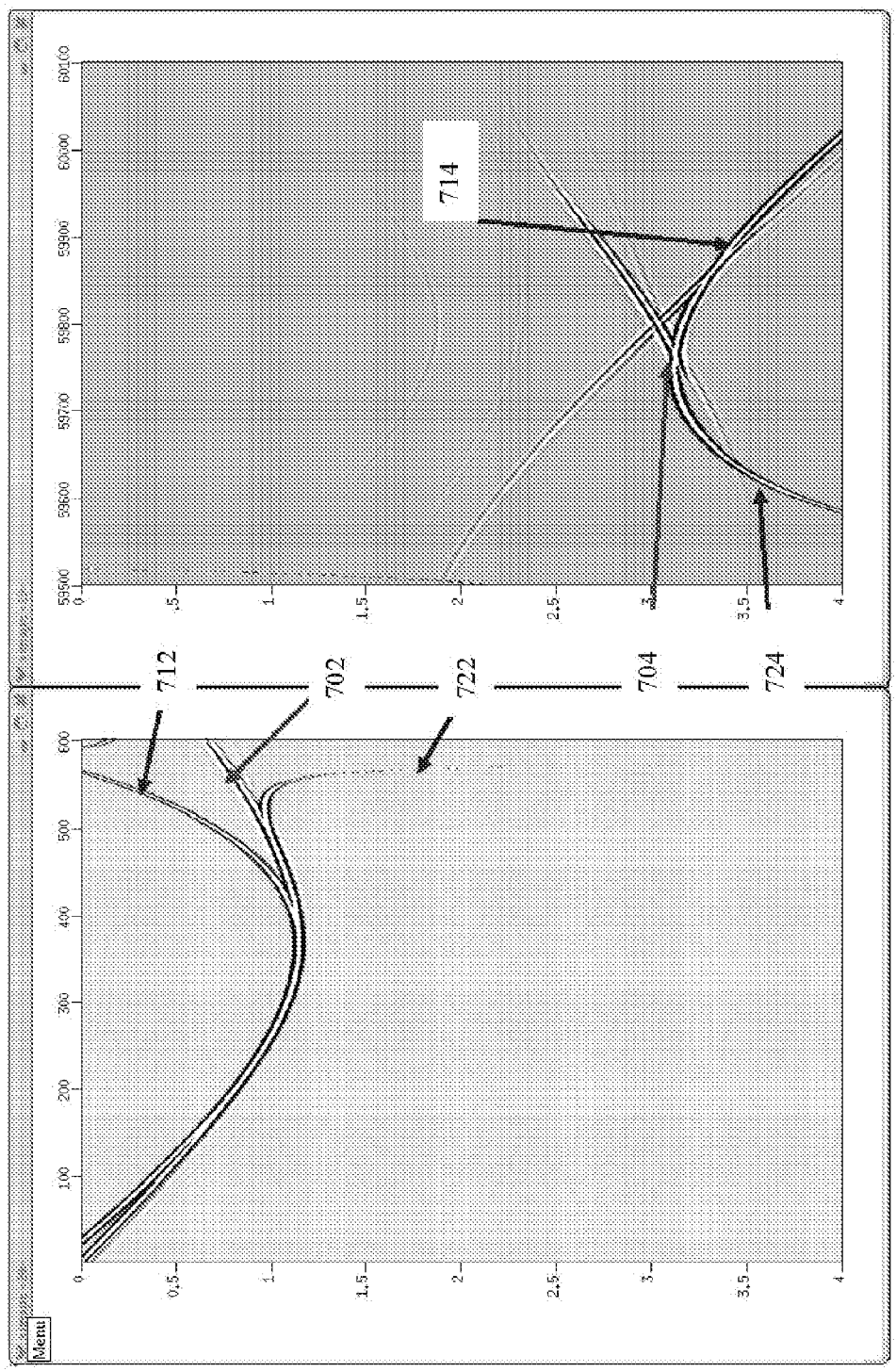
FIG. 7 depicts a different fitting of two wave-equation migration reflection operators computed above (left panel) and below (right panel) a planar dipping reflector.
Figure 8:
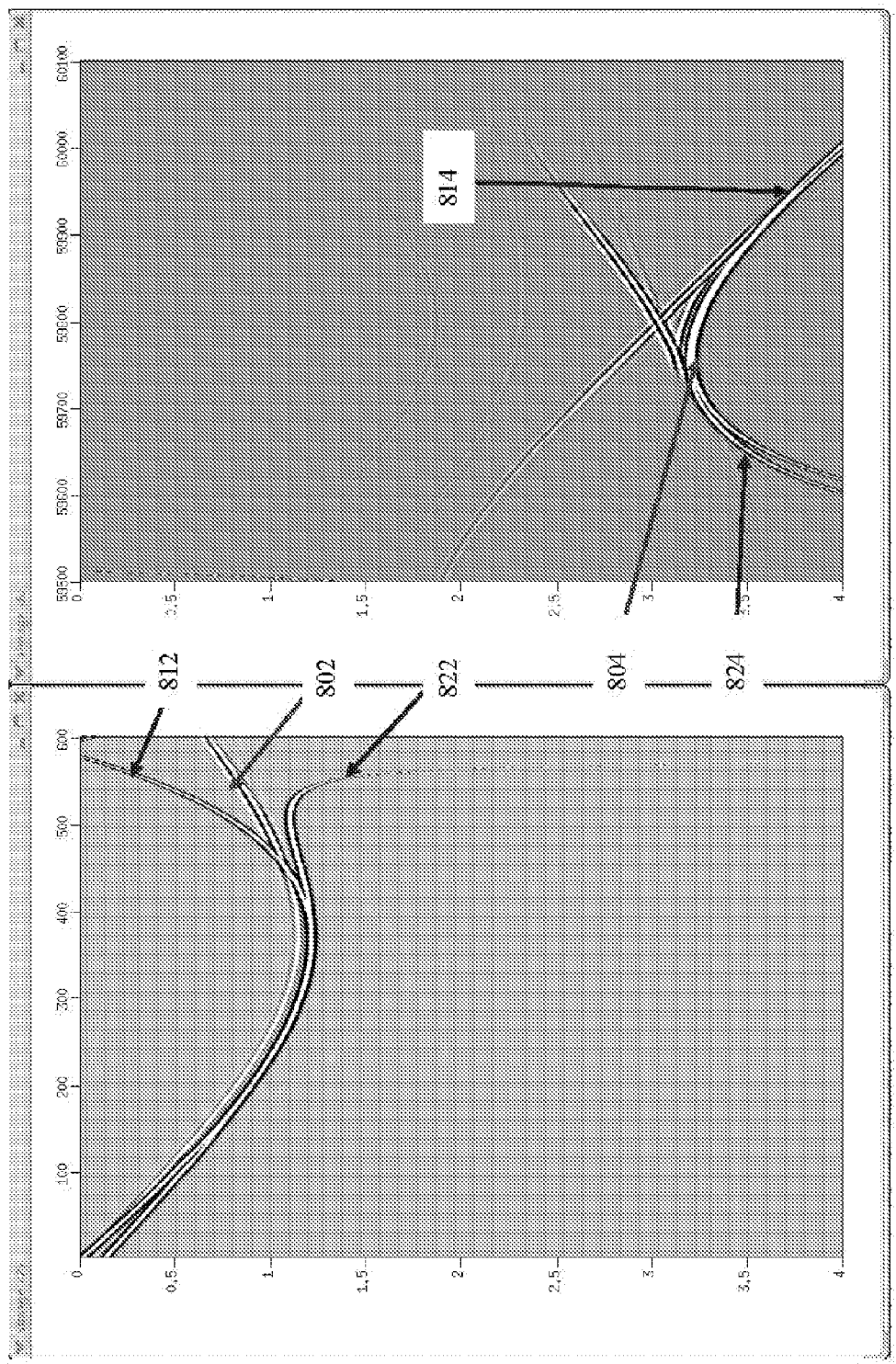
FIG. 8 depicts a third fitting of two wave-equation migration reflection operators computed above (left panel) and below (right panel) a planar dipping reflector.

FIGS. 6 to 8 illustrate examples using the qualitative approach for data from a model consisting of a single planar dipping reflector. The WEM operators have been superimposed on the two aforementioned analytic approximations. The WEM operators were computed using a migration velocity which was 10% smaller than the medium velocity. The figures show results of varying the velocity error parameter in the analytic approximation.

FIG. 6 shows the fitting of two WEM reflection operators computed above (left panel) and below (right panel) a planar dipping reflector. It shows the WEM reflection operators 602 and 604, small-dip small-offset approximation 612 and 614, and small-velocity error approximation 622 and 624. The panel on the right of FIG. 6 shows that the lateral extent of the WEM reflection operator is reduced by the synthetic-data aperture limitations. In other words, there are insufficient shot records to the left and to the right sides of the x-location of the reflection operator.

FIG. 7 shows the fitting of two WEM reflection operators computed above (left panel) and below (right panel) a planar dipping reflector. It shows the WEM reflection operators 702 and 704, small-dip small-offset approximation 712 and 714, and small-velocity error approximation 722 and 724. FIG. 7 shows the result of using the correct value of the velocity error parameter. Note that the (stationary-phase) approximation breaks down in certain regions of the x-t plane. However, within the region of applicability there is good agreement.

FIG. 8 shows the fitting of two WEM reflection operators computed above (left panel) and below (right panel) a planar dipping reflector. It shows the WEM reflection operators 802 and 804, small-dip small-offset approximation 812 and 814, and small-velocity error approximation 822 and 824. FIG. 8 shows the result of using a velocity which is 2.5% too high.

FIG. 5 suggests that events on a reflection operator may be matched with the corresponding geological layers above and below the depth at which the reflection operator is calculated. This property together with the assumptions used for deriving the kinematic approximation suggests performing the fitting on a layer by layer basis. This type of fitting procedure is therefore integrated within a WEM based "layer-stripping" method for refining the velocity model. The procedure for each layer is as follows:

1. Estimate a "background" velocity for the layer.
2. Migrate using the "background" velocity.
3. Construct reflection operators on a grid within layer.
4. Use a fitting of the reflection operators to obtain estimates of the velocity error, dip angle of the reflector and the vertical distance to the reflector.
5. Remigrate using the new velocity field within the layer.
6. Use the migrated image to interpret and define the lower boundary of the layer.
7. Estimate a "background" velocity for the next deepest layer. Then repeat steps 1 to 6 etc.

Note that the fitting procedure (Step 4) provides estimates of the velocity error, dip angle of the reflector (i.e. essentially the dip of the deeper lower boundary) and the vertical distance to the reflector. An important point is that dip is obtained from the local reflection-operator gather, rather than from a final fully-stacked image, and that this dip parameter is made more apparent by the use of wavefield coordinates.

Figure 9:
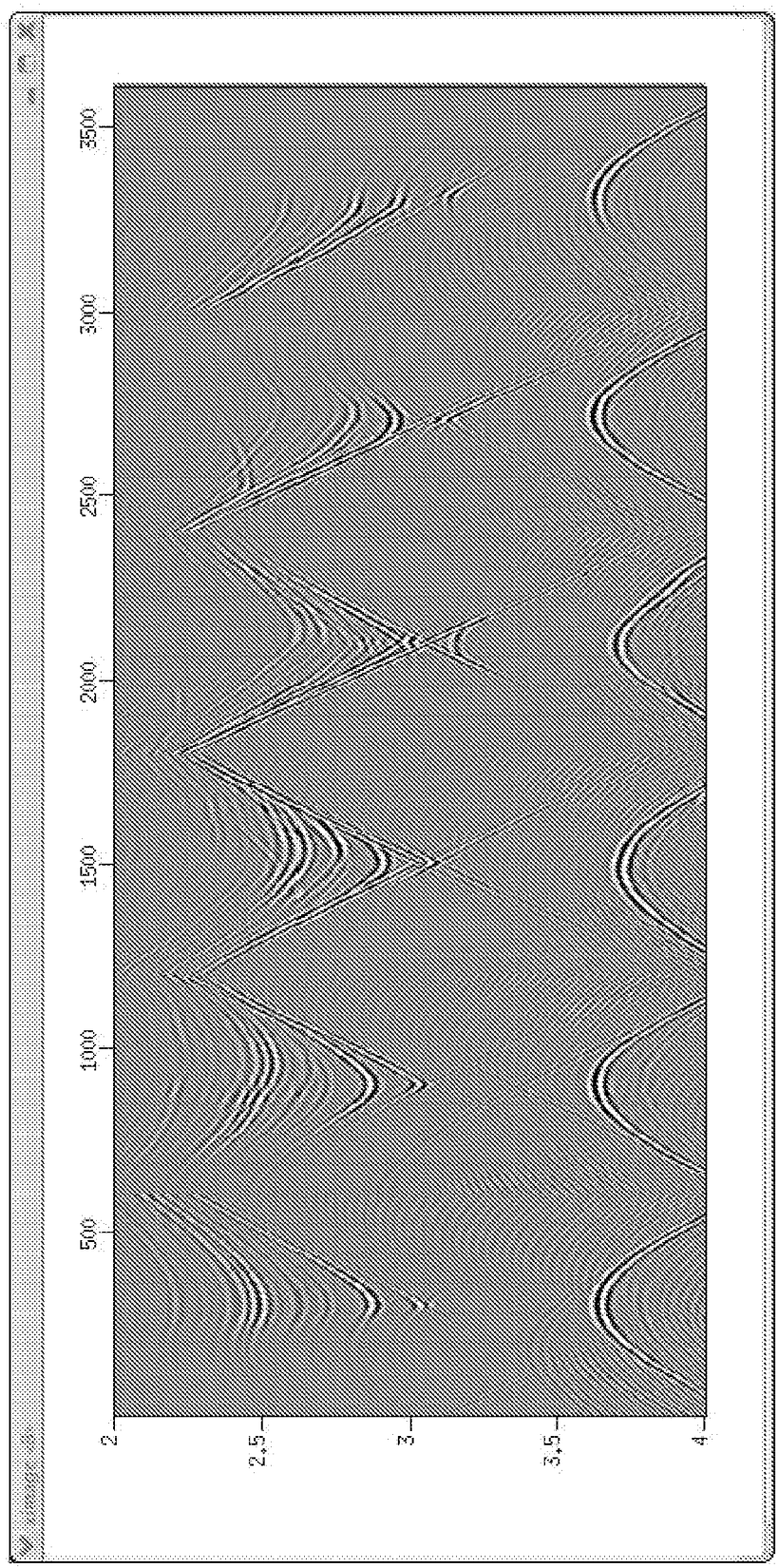
FIG. 9 depicts six reflection operators computed at a depth close to structural complexity.

FIG. 9 shows reflection operators computed at a depth proximate to structural complexity. In this case the operators are still interpretable in terms of the structure, but they are too complex to permit fitting with the kinematic approximation used above. In this case the model parameters must be derived using tomographic inversion.

Some distinctions between the invention and the work cited above are as follows. The data comprising wavefield-coordinates reflection operators may be interpreted as being due to a seismic quasi-point-source within the subsurface (or, better, a dipole source). Wavefield-coordinates reflection operators are therefore conceptually closer to an actual subsurface or local seismic experiment. Also, dipping structure causes wavefield-coordinates reflection operators to be spatially asymmetric and hence the presence of dip is more easily interpretable. Lastly, the wavefield nature of the reflection operators permits both asymptotic analysis (e.g. involving Snell's Law) and the derivation of dynamic formulae for the purpose of refining the structural model. The latter pertains to AVO, total reflection and head-wave effects.

Once the velocity model is close to being correct, the wavefield-coordinates reflection operator may show the effects of AVO, including in principle total reflection and head-wave signals. This opens up the incident angle range from 0 degree (normal to the interface) to the angle of total reflection. With that information, the above method will lead to estimates of velocity contrasts which can be used for validation or further refinement of the model.

Figure 10:
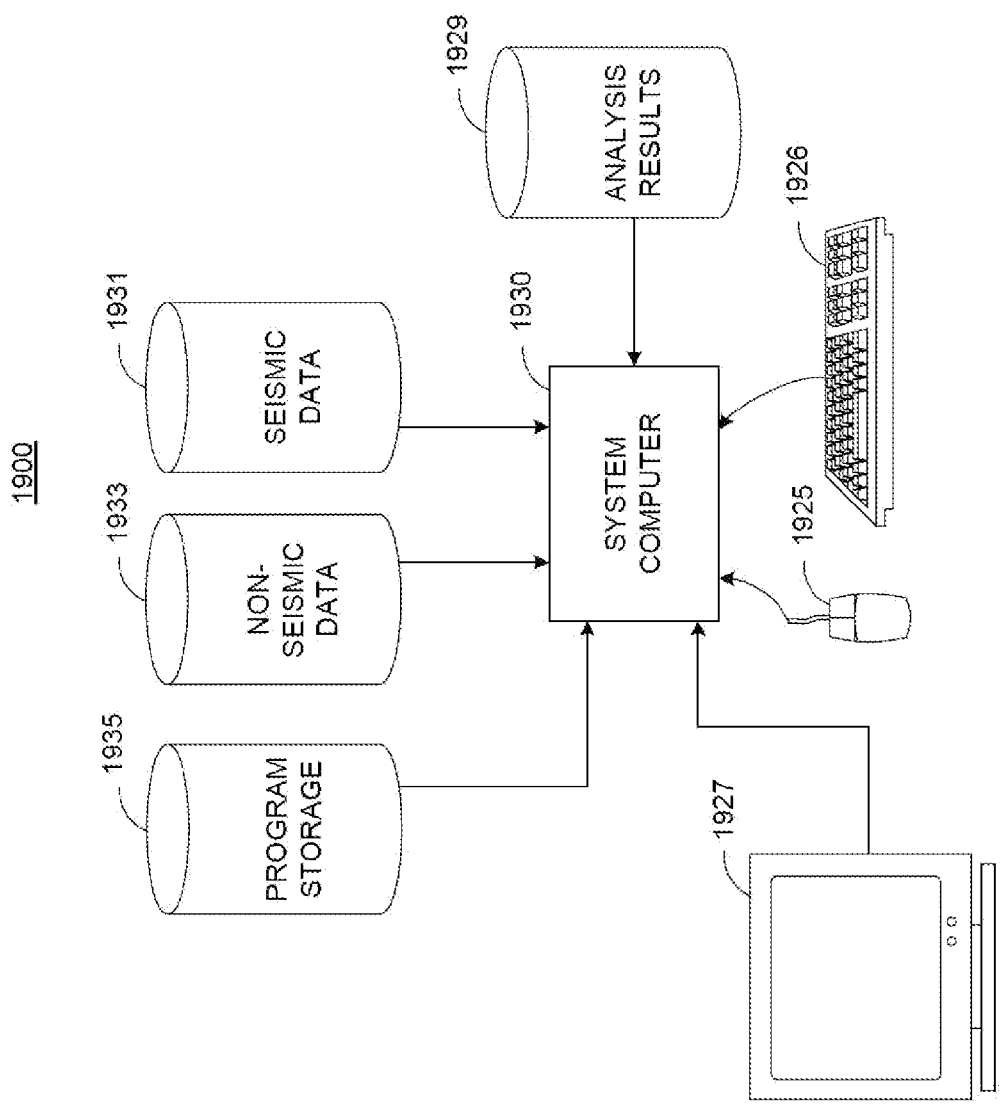
FIG. 10 depicts a computer system implementing a method.

The methods described above are typically implemented in a computer system 1900, one of which is shown in FIG. 10. The system computer 1930 may be in communication with disk storage devices 1929, 1931, 1933 and 1935, which may be external hard disk storage devices. It is contemplated that disk storage devices 1929, 1931, 1933 and 1935 are conventional hard disk drives, and as such, will be implemented by way of a local area network or by remote access. Of course, while disk storage devices are illustrated as separate devices, a single disk storage device may be used to store any and all of the program instructions, measurement data, and results as desired.

In one implementation, seismic data from the seismic receivers may be stored in disk storage device 1931. Various non-seismic data from different sources may be stored in disk storage device 1933. The system computer 1930 may retrieve the appropriate data from the disk storage devices 1931 or 1933 to process data according to program instructions that correspond to implementations of various techniques described herein. The program instructions may be written in a computer programming language, such as C++, Java and the like. The program instructions may be stored in a computer-readable medium, such as program disk storage device 1935. Such computer-readable media may include computer storage media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 1930. Combinations of any of the above may also be included within the scope of computer readable media.

In one implementation, the system computer 1930 may present output primarily onto graphics display 1927, or alternatively via printer 1928 (not shown). The system computer 1930 may store the results of the methods described above on disk storage 1929, for later use and further analysis. The keyboard 1926 and the pointing device (e.g., a mouse, trackball, or the like) 1925 may be provided with the system computer 1930 to enable interactive operation.

The system computer 1930 may be located at a data center remote from an exploration field. The system computer 1930 may be in communication with equipment on site to receive data of various measurements. The system computer 1930 may also be located on site in a field to provide faster feedback and guidance for the field operation. Such data, after conventional formatting and other initial processing, may be stored by the system computer 1930 as digital data in the disk storage 1931 or 1933 for subsequent retrieval and processing in the manner described above. While FIG. 19 illustrates the disk storage, e.g. 1931 as directly connected to the system computer 1930, it is also contemplated that the disk storage device may be accessible through a local area network or by remote access. Furthermore, while disk storage devices 1929, 1931 are illustrated as separate devices for storing input seismic data and analysis results, the disk storage devices 1929, 1931 may be implemented within a single disk drive (either together with or separately from program disk storage device 1933), or in any other conventional manner as will be fully understood by one of skill in the art having reference to this specification.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

We claim:

1. A method for obtaining an image for interpreting subsurface geology in geophysical exploration, comprising:
    constructing, by a system having a processor, a wavefield-coordinates reflection operator with a given velocity model, where the wavefield-coordinates reflection operator is a function of coordinates of a source wavefield and a receiver wavefield without being a function of midpoint-offset coordinates, and the wavefield-coordinates reflection operator relates the source wavefield to the receiver wavefield; and
    determining and correcting, by the system, an error in the velocity model using the wavefield-coordinates reflection operator.

2. The method of 1, wherein constructing the wavefield-coordinates reflection operator comprises:
    propagating the source and receiver wavefields to locations in a subsurface.

3. The method of 2, wherein propagating the source and receiver wavefields comprises propagating by extrapolation.

4. The method of 2, wherein propagating the source and receiver wavefields comprises propagating by migration.

5. The method of 2, further comprising using and interpreting dynamic and kinematic attributes of the wavefield-coordinates reflection operator.

6. The method of 1, wherein determining the error in the velocity model using the wavefield-coordinates reflection operator comprises determining the error by perturbation analysis.

7. The method of 1, wherein the determining and correcting of the error in the velocity model comprises:
    fitting the wavefield-coordinates reflection operator on a layer-by-layer basis; and
    layer-stripping to correct the error in the velocity model.

8. The method of 7, wherein layer-stripping to correct the error in the velocity model comprises:
    fitting the reflection operator to obtain an estimate of a dip angle of a reflector and a vertical distance to the reflector.

9. The method of 1, further comprising displaying the wavefield-coordinates reflection operator for locating a dip.

10. The method of claim 1, further comprising combining the source wavefield and receiver wavefield to obtain the image of a subsurface.

11. The method of claim 1, wherein the wavefield-coordinates reflection operator represents a reflection response of a subsurface for locations in the subsurface below a given depth.

12. The method of claim 1, further comprising:
    refining the velocity model based on the error; and
    re-iterating the constructing, determining, and correcting tasks for the refined velocity model.

13. A system for obtaining an image for interpreting subsurface geology in geophysical exploration comprising:
    at least one processor;
    a non-transitory computer readable medium containing instructions that when executed by the at least one processor cause the at least one processor to:
        construct a wavefield-coordinates reflection operator with a given velocity model, where the wavefield-coordinates reflection operator is a function of coordinates of a source wavefield and a receiver wavefield without being a function of midpoint-offset coordinates, and the wavefield-coordinates reflection operator relates the source wavefield to the receiver wavefield; and;
    determine and correct an error in the velocity model using the wavefield-coordinates reflection operator.

14. The system of 13, wherein constructing of the wavefield-coordinates reflection operator comprises propagating the source and receiver wavefields to locations in a subsurface.

15. The system of 14, wherein the at least one processor is to further use and interpret dynamic and kinematic attributes of the wavefield-coordinates reflection operator.

16. The system of 13, wherein determining and correcting the error in the velocity model comprises:
    fitting the wavefield-coordinates reflection operator on a layer-by-layer basis; and
    layer-stripping to correct the error in the velocity model.

17. The system of 16, wherein layer-stripping to correct the error in the velocity model comprise:
    fitting the wavefield-coordinates reflection operator to obtain an estimate of a dip angle of a reflector and a vertical distance to the reflector.

18. The system of claim 13, wherein the at least one processor is to further combine the source wavefield and receiver wavefield to obtain the image of a subsurface.

19. The system of claim 13, wherein the at least one processor is to further:
    refine the velocity model based on the error; and
    re-iterate the constructing, determining, and correcting tasks for the refined velocity model.

20. A non-transitory computer readable medium containing instructions that when executed by a computer cause the computer to:

construct a wavefield-coordinates reflection operator with a given velocity model, where the wavefield-coordinates reflection operator is a function of coordinates of a source wavefield and a receiver wavefield without being a function of midpoint-offset coordinates, and the wavefield-coordinates reflection operator relates the source wavefield to the receiver wavefield; and;

determine and correct an error in the velocity model using the wavefield-coordinates reflection operator.

21. The non-transitory computer readable medium of claim 20, wherein the instructions when executed cause the computer to further combine the source wavefield and receiver wavefield to obtain an image of a subsurface.

22. The non-transitory computer readable medium of claim 20, wherein the instructions when executed cause the computer to further:

refine the velocity model based on the error; and re-iterate the constructing, determining, and correcting tasks for the refined velocity model.

* * * * *